United States Patent [19]
Sasaki et al.

[11] Patent Number: 5,207,058
[45] Date of Patent: May 4, 1993

[54] INTERNAL COMBUSTION ENGINE

[75] Inventors: Shizuo Sasaki; Takanori Ueda, both of Shizuoka, Japan

[73] Assignee: Toyota Jidosha Kabushiki Kaisha, Tokyo, Japan

[21] Appl. No.: 791,886

[22] Filed: Nov. 13, 1991

[30] Foreign Application Priority Data

Nov. 16, 1990 [JP] Japan .................. 2-308627

[51] Int. Cl.$^5$ .............................................. F01N 3/36
[52] U.S. Cl. .................................. 60/284; 60/286;
60/294; 60/300; 60/303
[58] Field of Search ............ 60/274, 284, 285, 300, 60/303, 286, 294

[56] References Cited

U.S. PATENT DOCUMENTS

| | | | |
|---|---|---|---|
| 3,058,298 | 10/1962 | Morris | 60/294 |
| 3,451,213 | 6/1969 | Lang | 60/294 |
| 3,460,916 | 8/1969 | Aronsohn | 60/286 |
| 3,590,579 | 7/1971 | Takahashi | 60/303 |
| 3,779,015 | 12/1973 | Maruoka | 60/300 |
| 4,955,339 | 9/1990 | Sasaki | 123/295 |

FOREIGN PATENT DOCUMENTS

0150921 8/1984 Japan ............................ 60/285
2-169834 6/1990 Japan .

Primary Examiner—Ira S. Lazarus
Assistant Examiner—L. Heyman
Attorney, Agent, or Firm—Kenyon & Kenyon

[57] ABSTRACT

An internal combustion engine includes fuel injectors which directly inject high pressure fuel into combustion chambers of the engine. Spark plugs are provided in the combustion chambers, a catalytic converter is provided in the middle of the exhaust pipe for purifying the exhaust, and a temperature sensor is provided for detecting the temperature of a catalyst of the catalytic converter. A control unit which receives as input the engine rotational speed, load, and the detection value of the catalyst temperature sensor controls the engine such that, when the temperature of the catalyst is lower than a predetermined target temperature, the fuel injectors inject additional fuel into the combustion chambers during at least one of the expansion stroke and the exhaust stroke to mix the fuel with the exhaust. Thereafter, the exhaust having the additional fuel mixed in is reignited upstream of the catalytic converter to heat the catalyst to the target temperature.

11 Claims, 6 Drawing Sheets

2nd HALF OF COMPRESSION STROKE (COMBUSTION)

EXPANSION STROKE

Fig. 5(e)

EXHAUST STROKE

INTERNAL COMBUSTION ENGINE

BACKGROUND OF THE INVENTION

1. Field of the Invention

The present invention relates to an internal combustion engine, more particularly to a spark ignition engine of the direct cylinder injection type which directly injects fuel into combustion chambers of the engine and causes combustion by spark ignition and which purifies the exhaust from the combustion chambers of the engine by a catalytic converter.

2. Description of the Related Art

An example of a conventional direct cylinder injection type spark ignition engine is disclosed in Japanese Unexamined Patent Publication (Kokai) No. 2-169834 (see U.S. Pat. No. 4,955,339). In this engine, fuel injectors driven by actuators using piezoelectric elements and having a fast response are mounted on the cylinder heads of the engine. Fuel such as gasoline raised to a high pressure by a fuel injection pump is directly injected into the combustion chambers of the engine at suitable times in the first half of the intake stroke of the engine and the second half of the compression stroke in respectively suitable amounts and is ignited by the spark plugs mounted on the cylinder heads and burned.

The spray of fuel injected in the second half of the compression stroke forms an easily ignitable air-fuel mixture layer of about the stoichiometric air-fuel ratio just around the spark plugs even in the case of a lean air-fuel mixture in the combustion chambers. This serves as a pilot flame so that the flame propagates to the lean layer. This engine does not, like a diesel engine, in principle use a throttle valve to throttle the amount of intake for control of the output, so the combustion is performed under a three- to five-fold richness of air. Therefore, even during idling and other low load states, a large amount of air is taken into the combustion chambers, the air-fuel mixture becomes lean. Ignition is not possible by the spark plugs in that state, so stratified charge combustion is performed by the means as mentioned earlier.

The fuel injected in the first half of the intake stroke is injected toward the top surfaces of the pistons and cavities provided in the top surfaces for a certain period while the pistons are still at a high position after top dead center so as to avoid the fuel adhering to the cylinder walls. Consideration is given so that the spray of fuel is vaporized and sufficiently mixed with air during the relatively long period from the intake stroke to the compression stroke.

While not disclosed in the above-mentioned prior art, even in a direct cylinder injection type spark ignition engine, the exhaust is purified by a catalytic converter provided in the exhaust passage in the same way as with a usual spark ignition engine.

While not limited to direct cylinder injection type spark ignition engines, in general when a catalytic converter is used, if the temperature of the catalyst is low and does not reach the activation temperature, such as at the time of cold starts, the hydrocarbons, carbon oxides, etc. are not purified, but are discharged to the atmosphere, so to swiftly raise the purification efficiency, it has been proposed in the past to provide means which provides a heater in the exhaust pipe to heat the catalyst etc., but these are relatively troublesome and induce higher costs.

In particular, in an direct cylinder injection type spark ignition engine, as mentioned earlier, the engine is often run under a state of a higher air richness compared with a usual spark ignition engine, so the exhaust temperature tends to fall due to combustion of a lean air-fuel mixture and even after starting the temperature of the catalyst of the catalytic converter does not easily rise to the activation temperature, so the state of retarded exhaust purification continues for a long period and there is a danger of discharge of the unpurified exhaust.

SUMMARY OF THE INVENTION

The present invention has as its object to deal with this problem and enable the temperature of the catalytic converter to quickly reach the activation temperature by an advantageous means utilizing the properties of the construction of a direct cylinder injection type spark ignition engine.

To achieve the above-mentioned object, the present invention provides a direct cylinder injection type spark ignition engine characterized by being provided with fuel injectors which enable high pressure fuel to be directly injected into combustion chambers of the engine, spark plugs which are provided in the combustion chambers, a catalytic converter provided in the middle of the exhaust pipe for purifying the exhaust, a temperature sensor for detecting the temperature of a catalyst of the catalytic converter, and a control unit which receives as input the engine rotational speed, load, and detection values of the catalyst temperature sensor for controlling the engine, where, when the temperature of the catalyst is lower than a predetermined target temperature, the fuel injectors inject additional fuel into the combustion chambers under the instruction of the control unit during the expansion stroke or the exhaust stroke to mix it with the exhaust and where the exhaust having the additional fuel mixed in is reignited and burned upstream of the catalytic converter so as to heat the catalyst to the target temperature.

In the basic operation of the direct cylinder injection type spark ignition engine, at least a part of the high pressure fuel is directly injected into the combustion chambers of the engine at suitable timings of the intake stroke and/or compression stroke by the fuel injectors and is mixed with the intaken air and, also, is ignited by the discharge of the spark plugs to be normally burned.

According to the present invention, when a temperature sensor provided in the catalytic converter outputs a value lower than the target temperature during cold starts etc., the fuel injectors of the engine inject additional fuel during the expansion stroke or the exhaust stroke under the instruction of the control unit receiving this as input to make it be mixed in the air rich exhaust of the engine. The exhaust having the fuel mixed in it is reignited and burned in the region from the combustion chambers to the exhaust passage. This flows into the catalytic converter and heats the catalyst to raise its temperature.

BRIEF DESCRIPTION OF THE DRAWINGS

In the appended figures.

DESCRIPTION OF THE PREFERRED EMBODIMENTS

Figure 1:
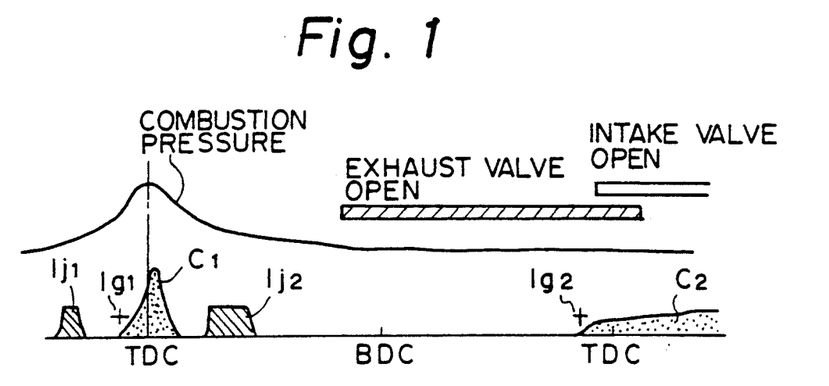
FIG. 1 illustrates a first embodiment of the present invention.
Figure 2:
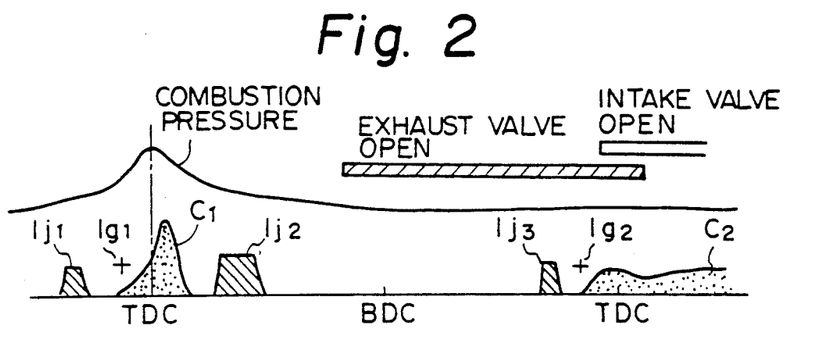
FIG. 2 illustrates a second embodiment of the present invention.
Figure 3:
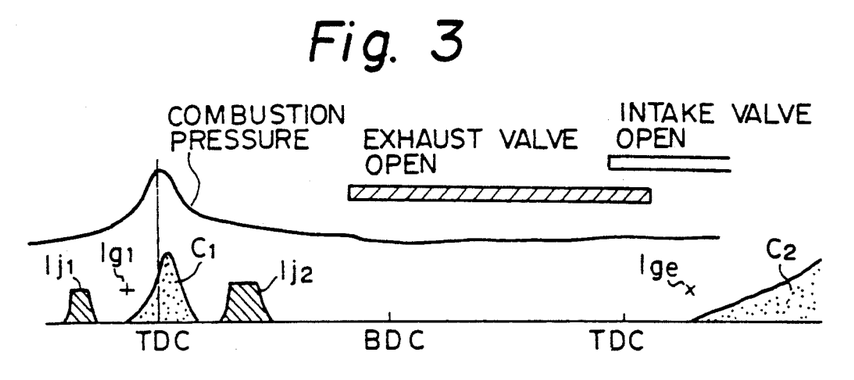
FIG. 3 is a timing chart showing the operation of the engine.

FIGS. 1 to 3 are time charts showing the operation of first to third embodiments of the present invention, respectively, enabling the features of the embodiments to be easily understood through a comparison with those of the others. The embodiments will be explained in detail below.

Figure 4:
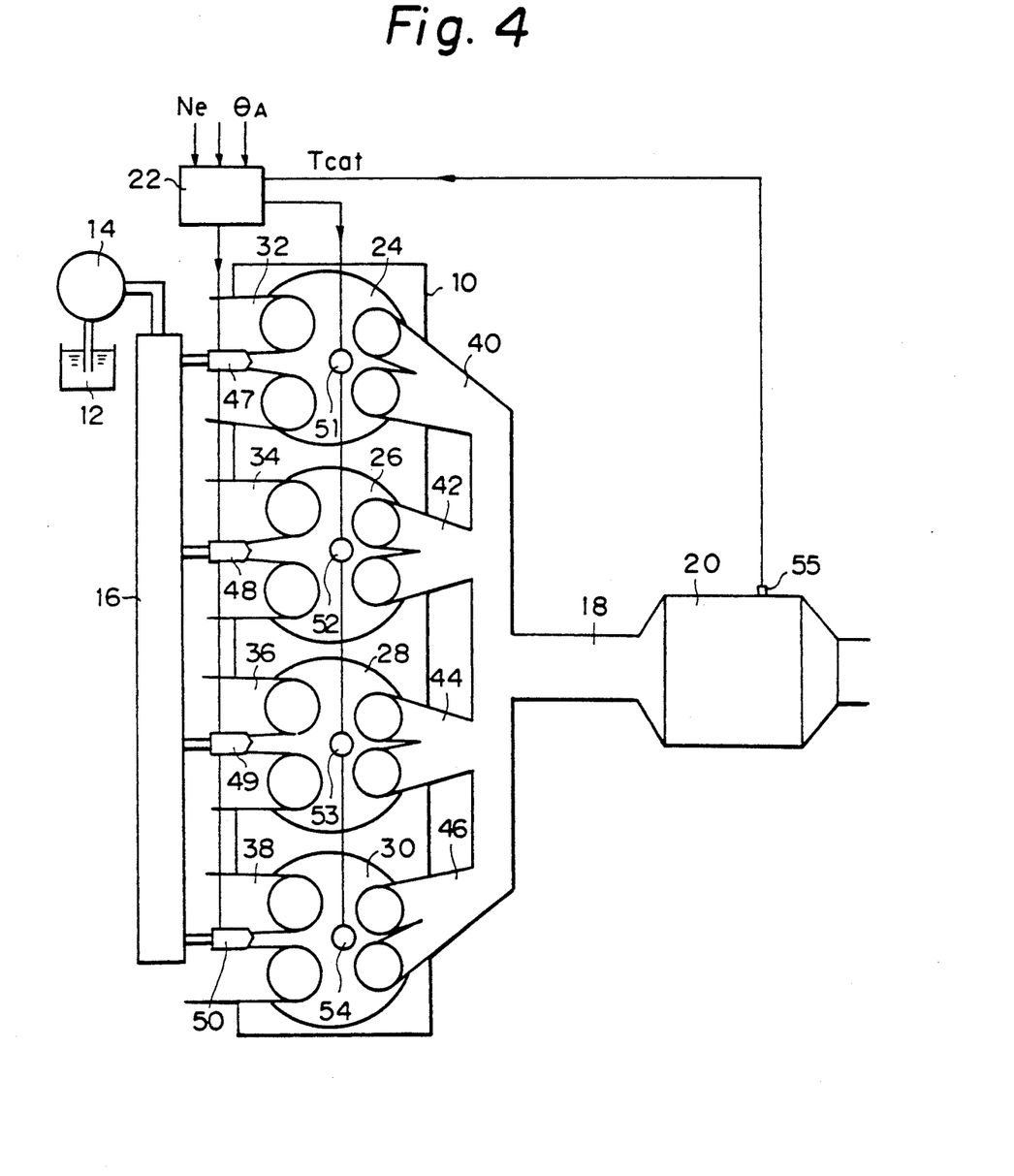
FIG. 4 is an overall constitutional view of an engine of the first embodiment.
Figure 5A:
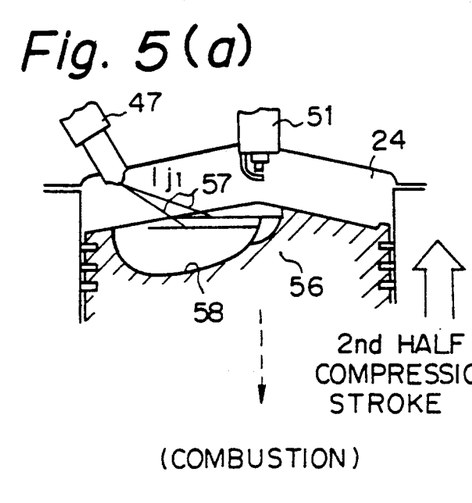
FIG. 5 illustrates the changes in the state in the combustion chambers of the engine of the first embodiment, wherein (a), (c), and (e) are front sectional views and (b) and (d) are plane views.
Figure 5B:
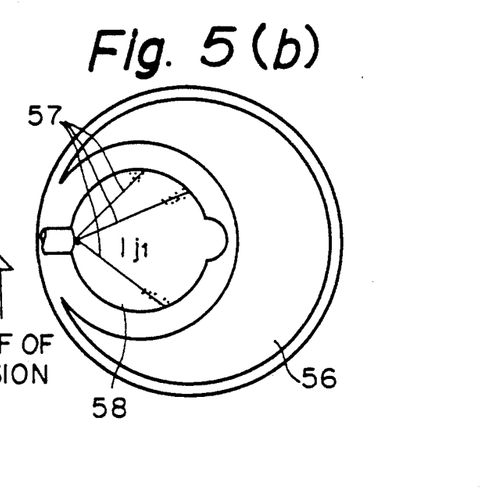
Figures 5C, 5D:
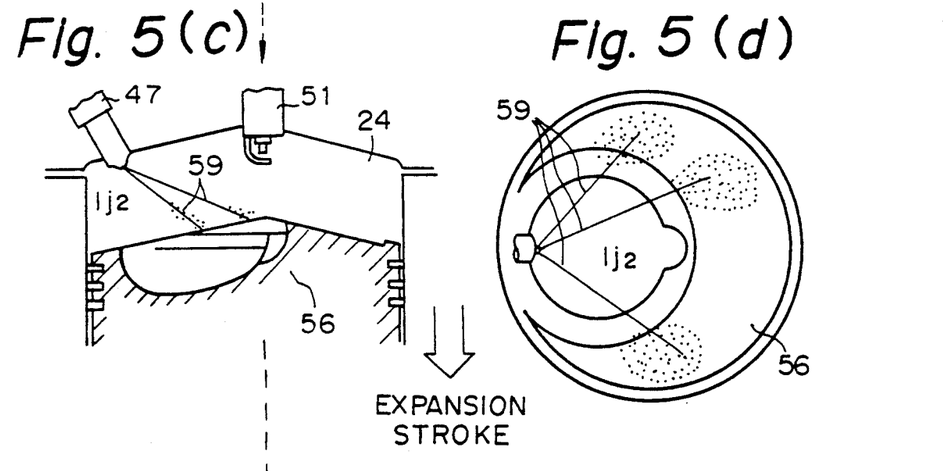
Figure 5E:
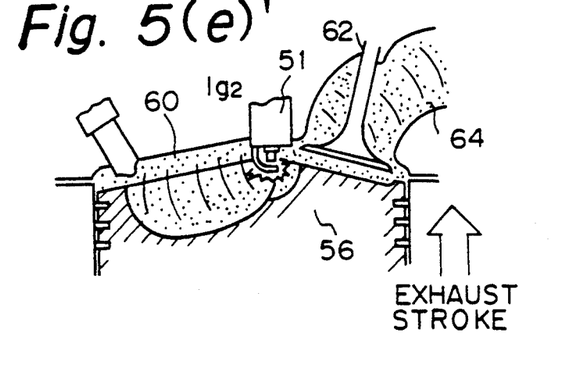
Figure 6:
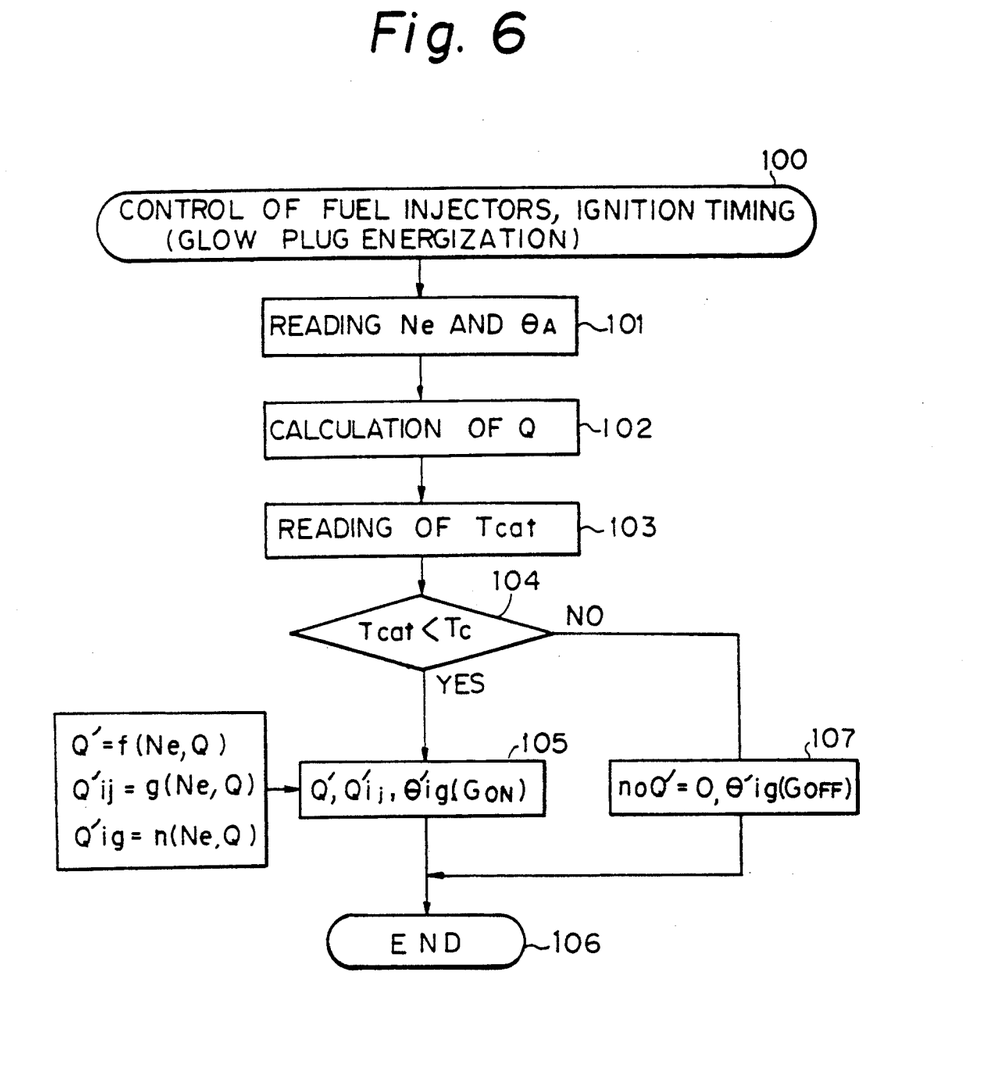
FIG. 6 is a flow chart showing together the control programs of the first and fourth embodiments of the present invention.

The first embodiment of the present invention is shown in FIG. 4 to FIG. 6 in addition to FIG. 1. The overall construction of the direct cylinder injection type spark ignition engine according to the first embodiment, as shown in the plane view of FIG. 4, includes a fuel injection pump 14 which pressurizes fuel to a high pressure (for example, 200 kg/cm$^2$), a reserve tank 16 common to the cylinders which temporarily stores the high pressure fuel and distributes the same, an exhaust passage 18 in which the exhausts from the cylinders merge and are led out, a catalytic converter 20 which is provided in the middle of the exhaust passage for purifying the exhaust, and an electronic control unit (ECU) 22 which controls the operating state of the engine.

The combustion chambers 24 to 30 of the cylinders are provided with intake ports 32 to 38 each having two intake valves and exhaust ports 40 to 46 each having two exhaust valves. The exhaust ports 40 to 46 merge and communicate through the exhaust passage 18 with the catalytic converter 20. In the combustion chambers 24 to 30 are provided fuel injectors 47 to 50 mounted at the cylinder heads in a manner so the tips can be opened. If the piezoelectric elements, not shown, controlled by the ECU 22 are energized, the injection ports are opened and high pressure fuel in the reserve tank 16 is injected into the combustion chambers 24 to 30. The pressure in the reserve tank 16 is substantially constant, so the amount of the fuel injected is proportional to the time the injection ports are opened.

Depending on the timings at which the injection ports are opened and closed, the positional relationship of the spray of fuel and the piston top wall or the various shaped cavities provided there differs and changes occur in the amount of the fuel adhering to the cylinder walls (not considered desirable in general since this dilutes the lubrication oil), the vaporization of the fuel, the degree of mixture with air, the quality of the combustion, etc., so the timings are important issues along with the direction of fuel injection, the injection angle, etc. and it is necessary to select the optimal ones, but this has no direct relationship in the present invention. Reference numerals 51 to 54 show spark plugs provided near the tops of the combustion chambers 24 to 30.

The ECU 22 receives as input from the various sensors (not shown) the rotational speed $N_e$ of the engine, the accelerator pedal depression $\theta_A$, and other signals showing the engine load and receives as input the catalyst temperature (may also be temperature near the catalyst, not the temperature of the catalyst itself) $T_{cat}$ from the temperature sensor 55 provided in the catalytic converter 20. Further, as mentioned later, the ECU 22 outputs the signal $Q'_{ij}$ for commanding the timing and duration of opening or closing the injection ports to the fuel injectors 47 to 50 and the signal $\theta'_{ig}$ for commanding the timing of energizing the spark plugs 51 to 54.

FIG. 5 illustrates the related construction of the combustion chamber 24 as an example of the four cylinders and the main operating states of the same (refer also to time chart of FIG. 1). The other cylinders have the same construction, but the timings of operation are shifted 180° in order of ignition. The state at the end of the compression stroke where the not illustrated intake valves and exhaust valves are both closed and the piston 56 has risen close to top dead center is shown in FIG. 5(a). In this state, the fuel injector 47 opens its injection port for exactly the time command by the ECU 22, uses the amount of fuel corresponding to the signal $Q'_{ij}$ as the spray 57, and injects the same into the deep cavity 58 provided in the top surface of the piston 56 (first injection $I_{j1}$ shown also in FIG. 1). This is the compression stroke injection, one of the characteristic features of a direct cylinder injection type spark ignition engine explained in the section on related art. In this example, as shown in the plane view of FIG. 5(b), the first injection $I_{j1}$ is performed only in the cavity 58, but the invention is not necessarily limited to this.

Near the spark electrode of the spark plug 51, the first injection $I_{j1}$ forms an air-fuel mixture of about the stoichiometric air-fuel ratio—the richest in the combustion chamber 24, so if the spark plug 51 is energized and discharges by the signal $\theta'_{ig}$ generated near the top dead center, first the rich air-fuel mixture near the spark plug 51 first ignites (first ignition $I_{g1}$). Using this as a pilot flame, the flame is propagated to the lean air-fuel mixture in the combustion chamber 24 and the air-fuel mixture as a whole burns (first combustion $C_1$). Therefore, it is possible to ignite and burn the overall air-fuel mixture quickly even with a lean air-fuel mixture which is difficult to ignite with just discharge of the spark plug 51. Note that the relatively lean air-fuel mixture in the combustion chamber 24 is formed by injecting fuel from the fuel injector 47 into the air in the combustion chamber 24 in advance during the intake stroke (intake stroke injection) to vaporize and mix the same in the medium and high load operating state, but sometimes a fuel injector (not shown) outside of the cylinder, provided at the intake port 32, may be used to inject part of the fuel to be fed into the intake air so as to send fuel into the combustion chamber 24 as an air-fuel mixture when the intake valves are opened.

In the operating state, the air-fuel mixture in the combustion chamber 24 ignites ($I_{g1}$) and burns ($C_1$), then at a suitable time in the expansion stroke where the piston descends, for example, from the middle of it to the bottom dead center, a second fuel injection $I_{j2}$ is performed from the fuel injector 47 to the combustion chamber 24. The spray shown as the fuel spray 59 in FIGS. 5(c) and (d) corresponds to the same. In this case, since the piston 56 is descending, the spray strikes the top surface broadly and since the top surface of the piston 56 is high in temperature, the fuel immediately vaporizes and mixes with the combustion gas 60 in the expanding cylinder.

As mentioned earlier, a direct cylinder injection type spark ignition engine is operated in an air-rich state, so it is possible to set things so that by the second injection $I_{j2}$ enough air sufficient to burn the fuel fed by the second fuel injector $I_{j2}$ remains in the combustion gas 60 and the air-fuel ratio of the exhaust reaches just the stoichiometric air-fuel ratio. If this is done, then use of a three-way catalyst in the catalytic converter 20 also becomes possible.

Further, in the first embodiment, as shown in FIG. 5(e), at the end of the exhaust stroke when the exhaust valves 62 open and the piston 56 rises from bottom dead center, the spark plug 51 of the combustion chamber 24 of the engine body 10 is again energized and the second ignition $I_{g2}$ is performed, so the fuel resulting from the second injection $I_{j2}$ flowing out from the exhaust port 40 along with the exhaust gas 64 is ignited. Therefore, the second combustion $C_2$ occurs in the wide range from inside the cylinder (combustion chamber 24) to outside the cylinder (exhaust port 40 and exhaust passage 18). The combustion propagates to even the unburnt gas exhausted from other cylinders and present in the exhaust passage 18 and raises the temperature of the exhaust gas 64 flowing in the exhaust passage 18, so the catalyst in the catalytic converter 20 is heated and quickly reaches its activation temperature, so the purification capability of the exhaust is sufficiently exhibited.

If it is detected by the temperature sensor 55 and the ECU 22 that the temperature of the catalyst has exceeded the target temperature preset using the activation temperature as a reference, the second combustion injection $I_{j2}$ and the second ignition $I_{g2}$ are stopped by a command of the ECU 22, the second combustion $C_2$ in the exhaust stroke is also stopped, and the state of operation returns to normal.

Unlike with a usual spark-ignition type internal combustion engine, in a direct cylinder injection type spark ignition engine, even in the expansion stroke and the exhaust stroke where the intake valves are closed, it is possible supply fuel into the combustion chambers 24 to 30 by just energizing the fuel injectors 47 and 50. The characterizing feature of the present invention is that use is made of this to perform a second in-cylinder injection $I_{j2}$ in the expansion stroke and use the inside of the cylinder like a carburetor. The characterizing feature of the first embodiment is that in the exhaust stroke, use is made of the spark plugs 51 to 54 in the combustion chambers 24 to 30 to perform the second ignition $I_{g2}$, whereby a second combustion $C_2$ is caused, mainly in the exhaust ports 40 to 46 and the exhaust passage 18, the temperature of the exhaust gas 64 is raised, and the catalyst is heated.

Therefore, the first embodiment does not require the addition of any special device to cause the second combustion $C_2$ and can be worked just by partial modification of the control program of the ECU 22. In this case, if the second ignition $I_{g2}$ is performed at the end of the exhaust stroke, there is no danger of occurrence of a torque in the reverse direction caused by the second combustion $C_2$ or a large back pressure.

The control program of the first embodiment (including common portions with fourth embodiment) is shown in FIG. 6. This program is repeatedly executed the ECU 22 at a rate of once every two rotations of the crankshaft in a four-cycle direct cylinder injection type spark ignition engine.

That is, if the control program is started at step 100, first at step 101, the engine rotational speed $N_e$ and the accelerator pedal cavity $\theta_A$ are read by a not shown central processing unit (CPU) of the ECU 22 as indicators of the engine operating state, then at step 102 the required amount of fuel injection Q is calculated from $N_e$ and $\theta_A$. Next, at step 103, the catalyst temperature $T_{cat}$, i.e., the detection signal of the temperature sensor 55 provided in the catalytic converter 20, is read and, at step 104, this is compared with the target temperature $T_c$ of the catalyst. When the temperature $T_{cat}$ of the catalyst is lower than the target temperature $T_c$, the routine proceeds to step 105, where the amount of fuel injection $Q'$ of the second fuel injection $I_{j2}$, the injection timing $Q'_{ij}$, and the ignition timing $\theta'_{ig}$, all of which are functions of the engine rotational speed $N_e$ and the required amount of fuel injection Q, are read from a map and output to the drive circuit, whereby the fuel injectors 47 to 50 perform the second injection $I_{j2}$ and the spark plugs 51 to 54 perform the second ignition $I_{g2}$. By this, as mentioned above, a second combustion $C_2$ is caused and the temperature of the catalyst rises.

At step 104, when it is judged that the catalyst temperature $T_{cat}$ is higher than the target temperature, the second injection $I_{j2}$ and the second ignition $I_{g2}$ are unnecessary, so at step 107, the amount of the second fuel injection $Q'$ is considered to be 0 and the second ignition timing signal $\theta'_{ig}$ is not generated, so the routine proceeds to step 106, where the program is ended. Therefore, the end continues its normal operating state without performing a second combustion $C_2$.

Next, FIG. 2 shows a second embodiment which can be achieved by modification of part of the control program of the first embodiment (FIG. 6). This example differs from the first embodiment in the point that just before the second ignition $I_{g2}$, a small amount of fuel is injected (third injection $I_{j3}$) from the fuel injectors 47 to 50 in the combustion chambers 24 to 30. (In this case, it is sufficient to modify part of the processing of the step 105 shown in FIG. 6.)

The third fuel injection $I_{j3}$ is performed at the time when the piston 56 approaches the top dead center (near end of exhaust stroke), so the space around the spark plugs 51 to 54 becomes smaller and a small amount of fuel is injected there, whereby an air-fuel mixture of a high fuel richness which is easily ignitable is formed near the spark plugs 51 to 54. Therefore, in the case of the second embodiment, when the second ignition $I_{g2}$ is performed, there is the effect that it is possible to reliably ignite the exhaust and cause the second combustion $C_2$.

Figures 7, 8:
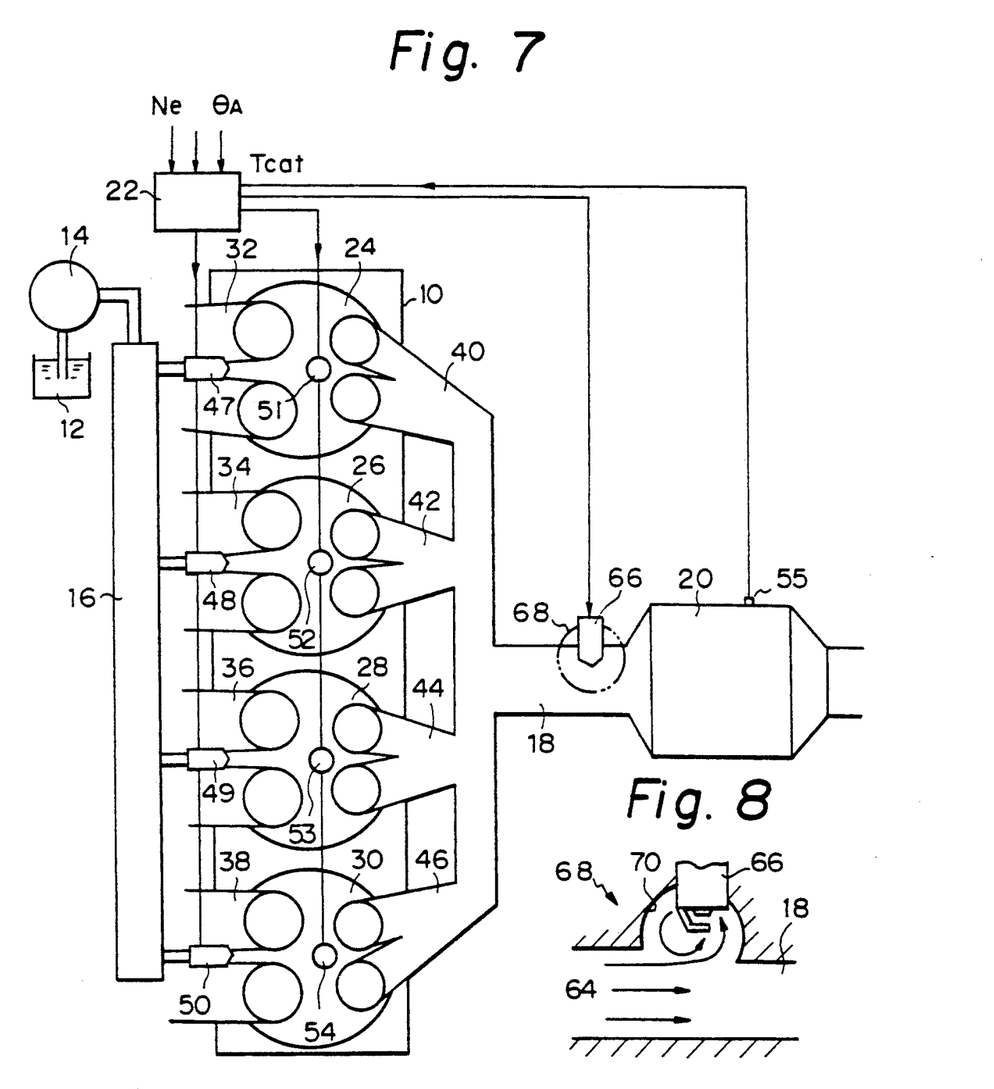
FIG. 7 is an overall constitutional view of an engine of a third embodiment.
FIG. 8 is a sectional view of key portions of the same.

FIG. 3, FIG. 7, and the partial enlargement of the same, FIG. 8, show the third embodiment of the present invention. FIG. 7 differs from FIG. 4, showing the first embodiment, in the point that special provision is made, in the middle of the exhaust passage 18, of an exhaust ignition unit 68 including a second spark plug 66. The construction of the exhaust ignition unit 68 is shown in detail in the enlarged sectional view of FIG. 8.

In this example, the second spark plug 66 is provided to project into a cavity 70 of the exhaust passage 18 and is energized at a suitable time after the exhaust stroke ends and the exhaust valves close, as shown in FIG. 3, by the command of the ECU 22. In the same way as the first embodiment and the second embodiment, at a suitable period of the expansion stroke (or the exhaust stroke), the second fuel injection $I_{j2}$ is executed by the fuel injectors 47 to 50 in the cylinders, so fuel necessary for maintaining the second combustion $C_2$ in the exhaust passage 18 is mixed in the exhaust gas 64. Therefore, if the second spark plug 66 discharges and performs ignition $I_{ge}$ outside of the cylinders, the exhaust gas 64 undergoes the second combustion $C_2$, is raised in temperature, and heats the catalyst when it passes through the catalytic converter 20 so as to promote the activation of the same.

The control program for the third embodiment entails a partial modification of the processing of steps 105 and 107 in FIG. 6, showing the program of the first embodiment, so that instead of finding the ignition timing $\theta'_{ig}$ of the second ignition $I_{g2}$, the ignition timing of the second spark plug 66 is found for the out-of-cylinder ignition $I_{ge}$. Of course, in a case like the third embodiment where the second spark plug 66 is provided in the cavity 70 of the exhaust passage 18 where the exhausts of the cylinders merge and flow, flame easily remains in the cavity 70 and serves as a pilot flame, so there is not that much need to strictly control the ignition timing for the out-of-cylinder ignition $I_{ge}$ and it is sufficient to simply intermittently repeat the discharge.

Figures 9, 10:
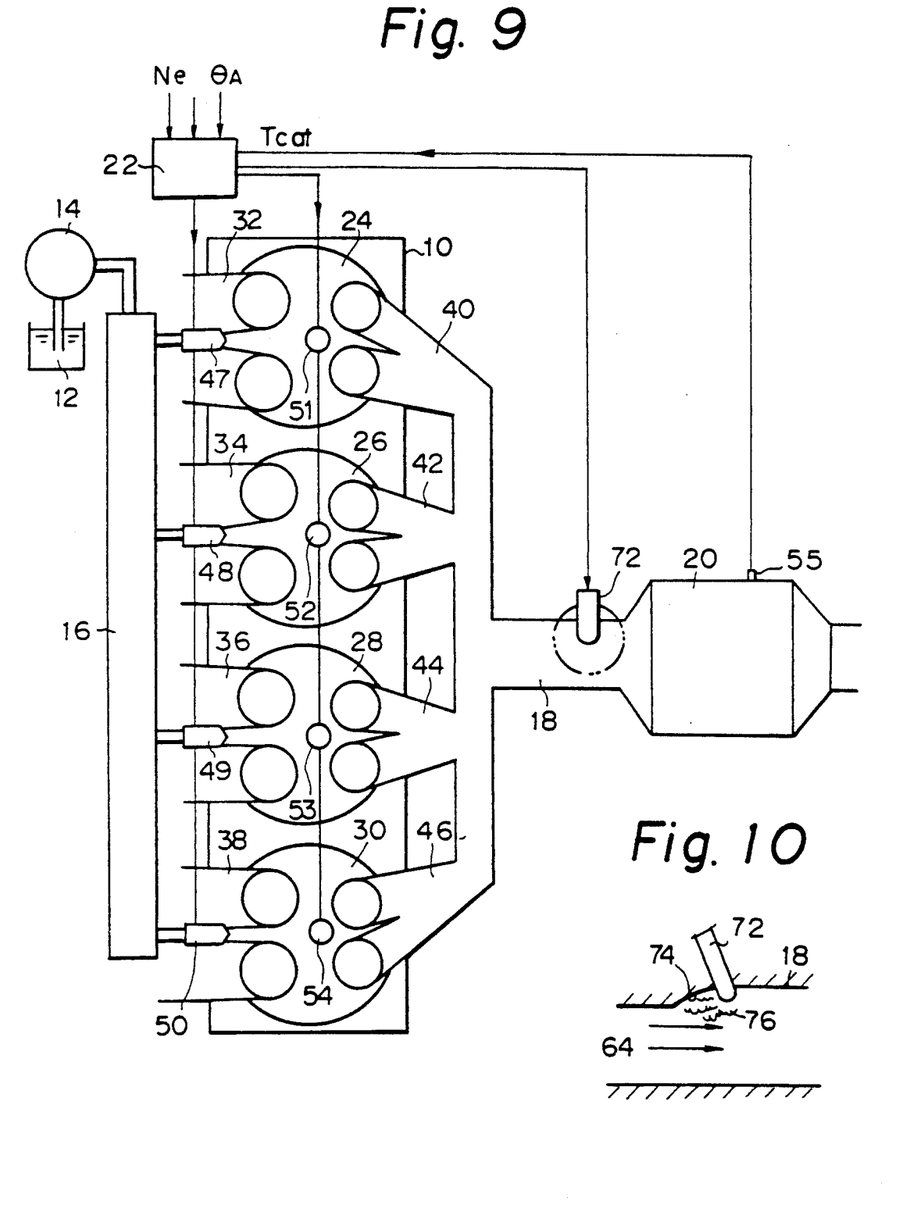
FIG. 9 is an overall constitutional view of an engine of a fourth embodiment.
FIG. 10 is a sectional view of key portions of the same.

The fourth embodiment, shown in FIG. 9 and the partial enlargement of the same, FIG. 10, corresponds to a replacement of the second spark plug 66 in the third embodiment by a glow plug such as used in a precombustion chamber etc. for promoting the start of a diesel engine, not a spark plug using high voltage discharge. Therefore, the overall construction shown in FIG. 9 is substantially the same as the first embodiment of FIG. 4 and the third embodiment of FIG. 7. Provision is made of the glow plug 72 in the middle of the exhaust passage 18. This is controlled by the ECU 22 so as to be energized when the temperature sensor 55 of the catalyst detects a value lower than the target temperature of the catalyst and thereupon heats the exhaust gas 64 passing it. In the same way as in the third embodiment shown in FIG. 3, it is possible to perform a second fuel injection $I_{j2}$ from the fuel injectors 47 to 50 in the cylinders in the expansion stroke (or in the exhaust stroke) to mix surplus air with the exhaust 64, so this ignites and burns in the exhaust passage 18 after coming into contact with the red hot glow plug 72 and the temperature of the exhaust gas 64 rises. When the catalyst is heated by this and the catalyst temperature $T_{cat}$ exceeds the target temperature $T_c$, the energization of the glow plug 72 is stopped and the second fuel injection $I_{j2}$ is also stopped.

The control program has many portions in common with that of the first embodiment, so is shown using FIG. 6 as well. $G_{ON}$ at step 105 shows the start of the energization of the glow plug, and $G_{OFF}$ at step 107 shows the cessation of the energization of the glow plug. Other parts of the processing are substantially the same as the case of the first embodiment. Note that the position where the glow plug 72 is mounted may be the stepped portion 74 in the exhaust passage 18 as shown in FIG. 10. By this, a swirl 76 with small exhaust is caused around the glow plug 72, the flame stays there, and this serves as a pilot flame, to form a stable combustion state in the exhaust passage 18. Further, the glow plug 72 does not act as a resistance in the exhaust flow.

In this way, the present invention utilizes the feature of a direct cylinder injection type spark ignition engine of operating in an air-rich state, operates the fuel injectors of the engine again at the time when the intake valves are closed, such as the expansion stroke or exhaust stroke of the engine, to perform an additional fuel injection, mixes this in the exhaust, and reignites the same, thereby causing the additional fuel to burn and raising the exhaust temperature to heat the catalyst of the catalytic converter so that it rises quickly to the activation temperature. Therefore, the startup of the catalytic converter is fast and a sufficient exhaust purification action can be exhibited.

Further, the additional fuel injection and reignition may be performed by the fuel injectors and spark plugs of the engine itself. In this case, it is possible to perform these by just a partial modification of the control program. Even when performing the reignition outside of the cylinders, it is possible to keep the modification of the construction to just provision of a second spark plug in the exhaust passage, so no particular increase in cost is induced and thus the invention can be economically worked.

We claim:

1. An internal combustion engine characterized by being provided with fuel injectors which enable high pressure fuel to be directly injected into combustion chambers of the engine, spark plugs which are provided in the combustion chambers, a catalytic converter provided in the middle of the exhaust pipe for purifying the exhaust, a temperature sensor for detecting the temperature of a catalyst of the catalytic converter and a control unit which receives as input the engine rotational speed, load, and the detection value of the catalyst temperature sensor for controlling the engine, where, when the temperature of the catalyst is lower than a predetermined target temperature, the fuel injectors inject additional fuel into the combustion chambers under the instruction of the control unit during at least one of the expansion and the exhaust strokes to mix it with the exhaust and wherein the internal combustion engine includes means for reigniting and burning the mixture of exhaust and additional fuel upstream of the catalytic converter so as to heat the catalyst to the target temperature.

2. An internal combustion engine as set forth in claim 1, characterized in that the catalytic converter houses a three-way catalyst and the additional fuel injected into the combustion chambers under the instruction of the control unit is supplied upstream of the catalytic converter so that the air-fuel ratio of the exhaust becomes the stoichiometric air-fuel ratio.

3. An internal combustion engine as set forth in claim 1, characterized in that the reignition of the exhaust is performed by reenergizing the spark plugs provided in the combustion chambers.

4. An internal combustion engine as set forth in claim 1, wherein said means for reigniting and burning the mixture of exhaust and additional fuel ignites the mixture of exhaust and fuel at the end of the exhaust stroke.

5. An internal combustion engine as set forth in claim 1, characterized in that discrete portions of a total amount of additional fuel to be supplied in the combustion chambers by the fuel injectors are injected at predetermined times during the expansion and exhaust strokes.

6. An internal combustion engine as set forth in claim 1, characterized in that a second plug is provided in the middle of the exhaust passage.

7. An internal combustion engine as set forth in claim 6, characterized in that the second plug is a spark plug.

8. An internal combustion engine as set forth in claim 6, characterized in that the second plug is a glow plug.

9. An internal combustion engine as set forth in claim 6, characterized in that the second plug is provided in the middle of a cavity of the exhaust passage.

10. An internal combustion engine as set forth in claim 6, characterized in that the second plug is provided in a stepped portion of the exhaust passage.

11. An internal combustion engine as set forth in claim 1, characterized in that the additional fuel injection and the reignition are stopped when the temperature of the catalyst exceeds a predetermined target value.

* * * * *